United States Patent
Kamon et al.

(10) Patent No.: US 12,506,212 B2
(45) Date of Patent: Dec. 23, 2025

(54) SECONDARY BATTERY ACCOMMODATING STRUCTURE AND HUMANOID ROBOT

(71) Applicant: KAWASAKI JUKOGYO KABUSHIKI KAISHA, Kobe (JP)

(72) Inventors: Masayuki Kamon, Kobe (JP); So Yukizaki, Kobe (JP); Junichi Karasuyama, Kobe (JP); Yuki Tanaka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 874 days.

(21) Appl. No.: 17/638,216

(22) PCT Filed: Sep. 2, 2020

(86) PCT No.: PCT/JP2020/033232
§ 371 (c)(1),
(2) Date: Feb. 25, 2022

(87) PCT Pub. No.: WO2021/045087
PCT Pub. Date: Mar. 11, 2021

(65) Prior Publication Data
US 2022/0294065 A1 Sep. 15, 2022

(30) Foreign Application Priority Data
Sep. 2, 2019 (JP) .................. 2019-159764

(51) Int. Cl.
*H01M 50/264* (2021.01)
*B25J 9/00* (2006.01)
(Continued)

(52) U.S. Cl.
CPC ......... *H01M 50/264* (2021.01); *B25J 9/0009* (2013.01); *B25J 9/06* (2013.01); *B25J 19/005* (2013.01); *H01M 50/233* (2021.01)

(58) Field of Classification Search
CPC ............. H01M 50/264; H01M 50/233; H01M 50/247; H01M 2220/30; B25J 9/0009; B25J 9/06; B25J 19/005; Y02E 60/10
See application file for complete search history.

(56) References Cited

U.S. PATENT DOCUMENTS

2004/0027086 A1* 2/2004 Ogawa ................... B25J 19/005
  318/568.12
2006/0265104 A1* 11/2006 Saito ................... H01M 50/213
  700/245

(Continued)

FOREIGN PATENT DOCUMENTS

JP  2012-125869 A  7/2012

*Primary Examiner* — Michael L Dignan
(74) *Attorney, Agent, or Firm* — METROLEX IP LAW GROUP, PLLC; Robert L. Scott, Esq.

(57) ABSTRACT

A secondary battery accommodating structure disposed at a humanoid robot includes an accommodating part for a secondary battery module, that is disposed inside cladding of a body of the humanoid robot and opens in a first direction that is a lateral direction, a fixing part that fixes the secondary battery module to the accommodating part, and a drawing space for the secondary battery module, located in the first direction with respect to the accommodating part, within the cladding of the body. The drawing space opens at least either one of upwardly or downwardly to allow in and out of the secondary battery module.

12 Claims, 5 Drawing Sheets

(51) Int. Cl.
  *B25J 9/06* (2006.01)
  *B25J 19/00* (2006.01)
  *H01M 50/233* (2021.01)

(56) References Cited

U.S. PATENT DOCUMENTS

2017/0106738 A1* 4/2017 Gillett .................. B62K 11/007
2018/0262029 A1* 9/2018 Miller .................... H02J 50/10

* cited by examiner

SECONDARY BATTERY ACCOMMODATING STRUCTURE AND HUMANOID ROBOT

CROSS-REFERENCE TO RELATED APPLICATIONS

This application is a national stage entry of International Application No. PCT/JP2020/033232 filed on Sep. 2, 2020, which claims priority based on the Article 8 of Patent Cooperation Treaty from the prior Japanese Patent Application No 2019-159764, filed on Sep. 2, 2019, the entire contents of all of which are incorporated herein by reference.

TECHNICAL FIELD

The present disclosure relates to a secondary battery accommodating structure and a humanoid robot.

BACKGROUND ART

Conventionally, humanoid robots are known, which carries a secondary battery as a power supply and carries out bipedal locomotion. For example, Patent Document 1 discloses a bipedal robot which carries a battery in a main body part. The bipedal robot is provided with a holding device for the battery inside an external panel of the main body part.

REFERENCE DOCUMENT OF CONVENTIONAL ART

Patent Document

[Patent Document 1] JP2012-125869A

DESCRIPTION OF THE DISCLOSURE

If the battery is accommodated inside the external panel like the bipedal robot of Patent Document 1, the external panel needs to be attached and detached for replacement of the battery, and it requires time and effort for the replacement of the battery.

Thus, one purpose of the present disclosure is to provide a secondary battery accommodating structure and a humanoid robot, which allow easier replacement of a secondary battery module, such as a battery.

In order to achieve the purpose, according to one aspect of the present disclosure, a secondary battery accommodating structure disposed at a humanoid robot, includes an accommodating part for a secondary battery module, that is disposed inside cladding of a body of the humanoid robot and opens in a first direction that is a lateral direction, a fixing part that fixes the secondary battery module to the accommodating part, and a drawing space for the secondary battery module, located in the first direction with respect to the accommodating part, within the cladding of the body. The drawing space opens at least either one of upwardly or downwardly to allow in and out of the secondary battery module.

A humanoid robot according to another aspect of the present disclosure includes the secondary battery accommodating structure according to the one aspect of the present disclosure, and the body.

According to the technique of the present disclosure, replacement of the secondary battery module can be easy.

MODE FOR CARRYING OUT THE DISCLOSURE

Figure 1:
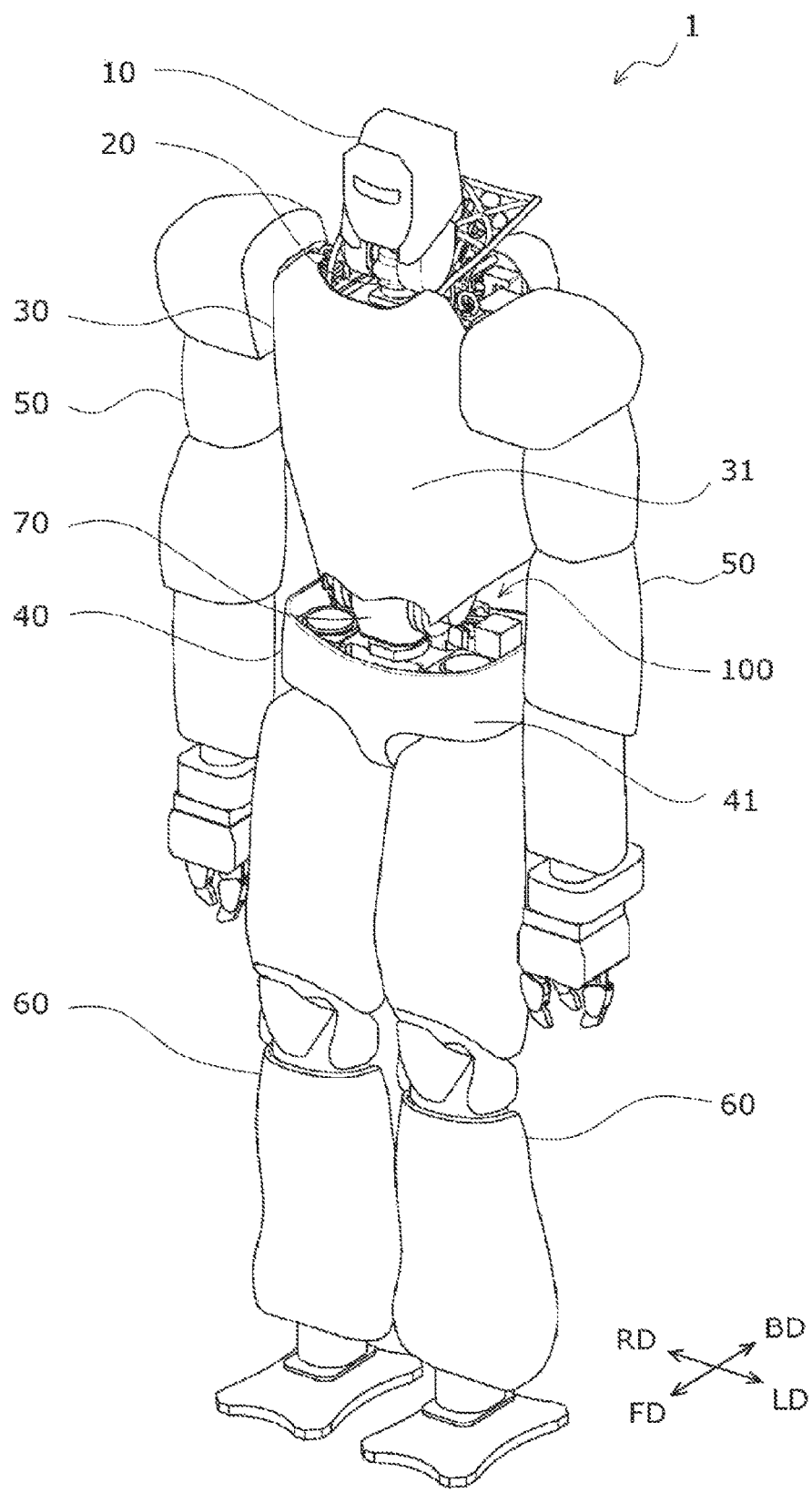
FIG. 1 is a perspective view illustrating one example of a humanoid robot according to one embodiment, when seen from the front.

Hereinafter, one embodiment of the present disclosure is described with reference to the drawings. Note that any embodiment which will be described below illustrates a comprehensive or concrete example. Further, among components in the following embodiment, components that are not described in an independent claim that illustrates the top concept will be described as arbitrary components. Each of the accompanying drawings is a schematic drawing, and is not necessarily illustrated exactly. Further, in each drawing, the same reference characters are assigned to substantially the same components, and redundant explanation may be omitted or simplified. The term "device" as used herein and the claims may not only mean a sole device, but may mean a system comprised of a plurality of devices.

<Configuration of Humanoid Robot>

Figure 2:
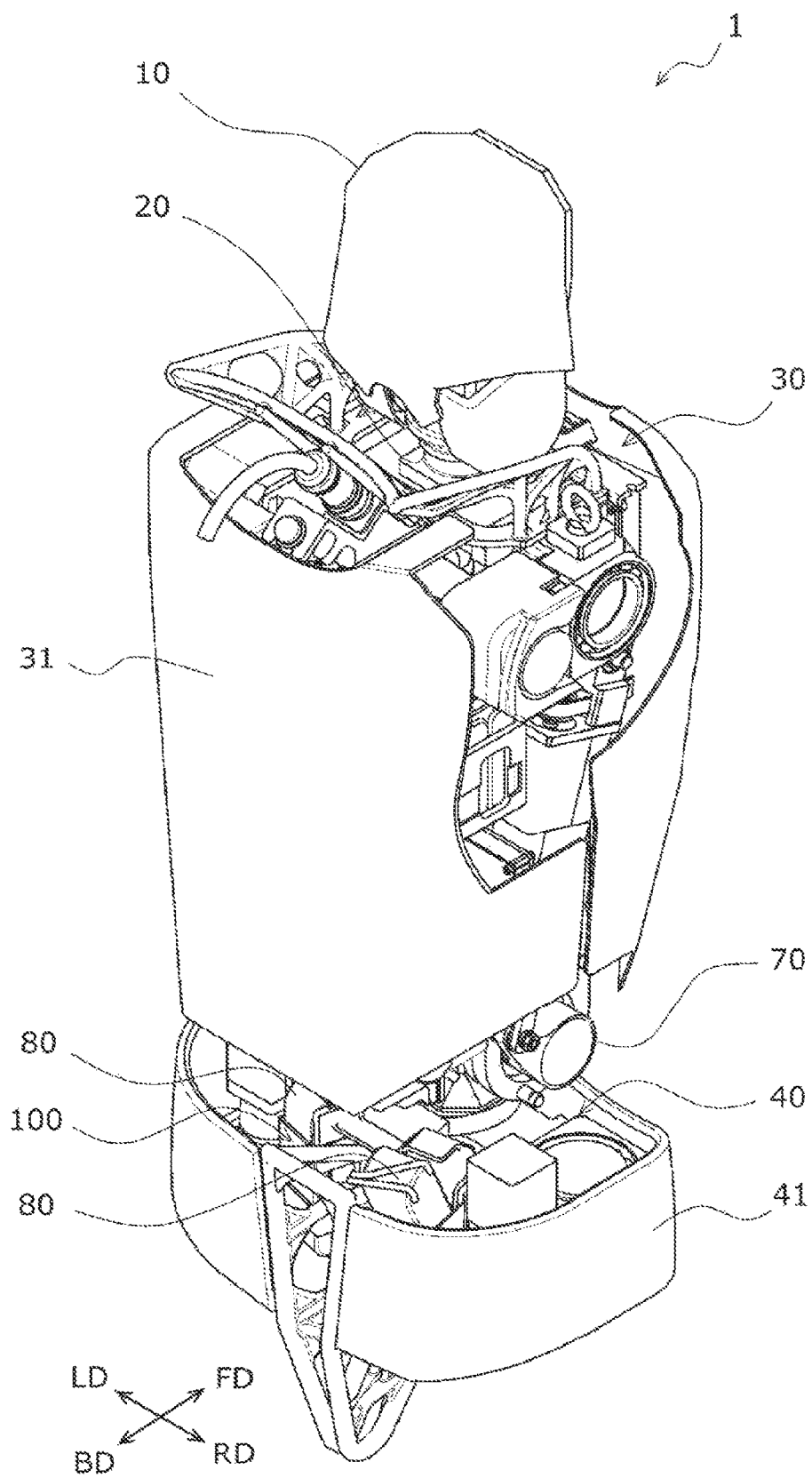
FIG. 2 is a perspective view illustrating one example of a configuration from a head to a lower body of the humanoid robot according to this embodiment, when seen from the rear.

FIG. 1 is a perspective view illustrating one example of a humanoid robot 1 according to this embodiment, when seen from the front. FIG. 2 is a perspective view illustrating one example of a configuration of the humanoid robot 1 according to this embodiment, from a head 10 to a lower body 40, when seen from the rear. Note that, in FIG. 2, a part of cladding 31 of an upper body 30 is illustrated as being cut off. As illustrated in FIGS. 1 and 2, the humanoid robot 1 according to this embodiment has the head 10, a neck 20, the upper body 30, the lower body 40, arms 50, and legs 60. The humanoid robot 1 is also referred to as a "humanoid" or "bipedal robot," which is configured to perform bipedal locomotion by controlling the drive of the legs 60. The humanoid robot 1 can also perform a work etc similar to a human, by driving the arms 50 and the legs 60 to move hand parts at tip ends of the arms 50 and foot parts at tip ends of the legs 60.

Each of the arm 50 and the leg 60 has a plurality of links and joints which bendably connect the plurality of links, respectively. Each of the arm 50 and the leg 60 carry out the bending motion by adjacent links bending with respect to each other via the joint. The upper body 30 and the lower body 40 are connected to each other so as to be bendable via a joint 70. The upper body 30 can carry out a forward bending motion, a rearward bending motion, and a circumnutating motion to the left and right, with respect to the lower body 40. The lower body 40 may correspond to a human's pelvis, and the joint 70 may correspond to a human's waist. A drive is provided to each joint and it drives the bending motion or the circumnutating motion of the joint. The drive has a drive source, such as an electric motor such as a servomotor, and an actuator. In response to a control of operation thereof, the drive bends the link in a desired bending direction at a desired bending angle, or bends the upper body 30 in a desired bending direction at a desired bending angle and circumnutates the upper body 30 in a desired turning direction at a desired turning angle.

The lower body 40 is covered with cladding 41. For example, the cladding 41 is a plate-like cover. The humanoid robot 1 is provided inside the cladding 41 of the lower body 40 with a secondary battery module 80 and a secondary battery accommodating structure 100 which accommodates the secondary battery module 80. The secondary battery module 80 and the secondary battery accommodating structure 100 are disposed at the back side of the lower body 40 (in detail, at the back side of the joint 70). Although not limited to this configuration, the secondary battery accommodating structure 100 accommodates two secondary battery modules 80. The secondary battery accommodating structure 100 accommodates one secondary battery module 80 on each of both left and right sides of the lower body 40 with respect to the center of the lower body 40.

Here, each of back parts of the upper body 30 and the lower body 40 corresponds to the back and the buttocks of the humanoid robot 1, and is a part of the upper body 30 in the rearward bending direction of the humanoid robot 1 in the upright position. Front parts of the upper body 30 and the lower body 40 correspond to the chest and the abdomen of the humanoid robot 1, respectively. Further, on the basis of the humanoid robot 1 in the upright position, the rearward bending direction is referred to as a "back direction BD," the forward bending direction is referred to as a "front direction FD," the right side with respect to the front direction FD is referred to as a "right direction RD," and the left side with respect to the front direction FD is referred to as a "left direction LD."

The secondary battery module 80 stores electricity and supplies the power to devices which use the power as the power source, such as drives of the humanoid robot 1. The secondary battery module 80 receives the supply of the power by being connected with a power supply external to the humanoid robot 1, and accumulates the power. The secondary battery module 80 includes one or more secondary batteries. The secondary battery module 80 may include one or more integrated secondary batteries, or may include one or more separated secondary batteries. The secondary battery is also referred to as the "rechargeable battery," and is a battery in which the electric power is chargeable and dischargeable. The secondary battery may be comprised of a lead secondary battery, a rechargeable lithium-ion battery, a nickel-hydrogen secondary battery, or a nickel-cadmium secondary battery. In this embodiment, the secondary battery module 80 includes a laminated type battery which is a secondary battery covered with lamination packing material, and, for example, it has an elongated rectangular parallelepiped shape. Such a secondary battery module 80 permits some deformation. Note that the secondary batteries included in the secondary battery module 80 is not limited to the laminated type battery, but may be any kind of secondary battery, such as a secondary battery covered with rigid external covering.

<Configuration of Secondary Battery Accommodating Structure>

Figure 3:
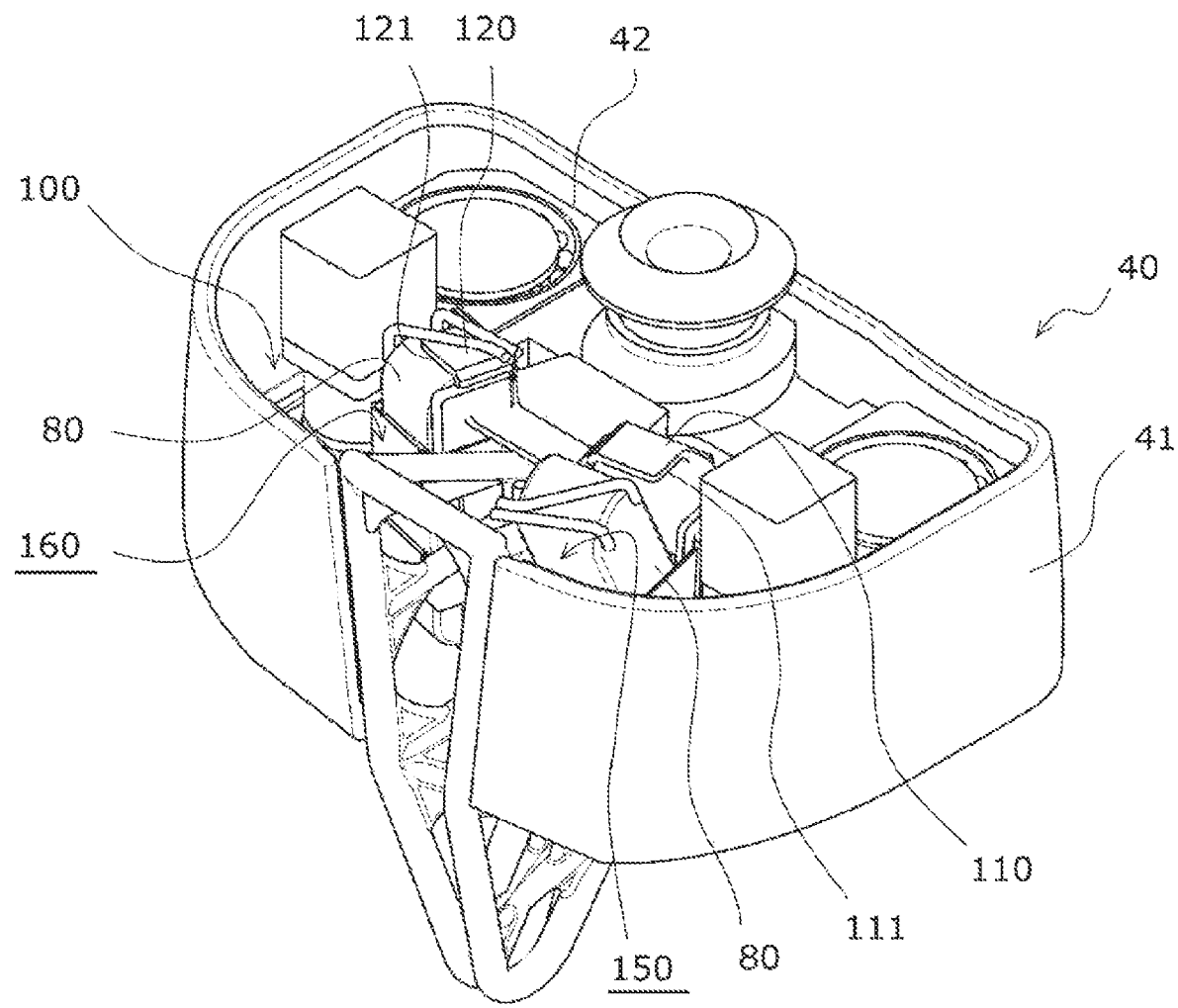
FIG. 3 is a perspective view illustrating one example of a configuration of the lower body of the humanoid robot according to this embodiment, when seen from the rear.
Figure 3:
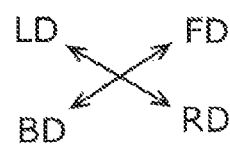
Figure 4:
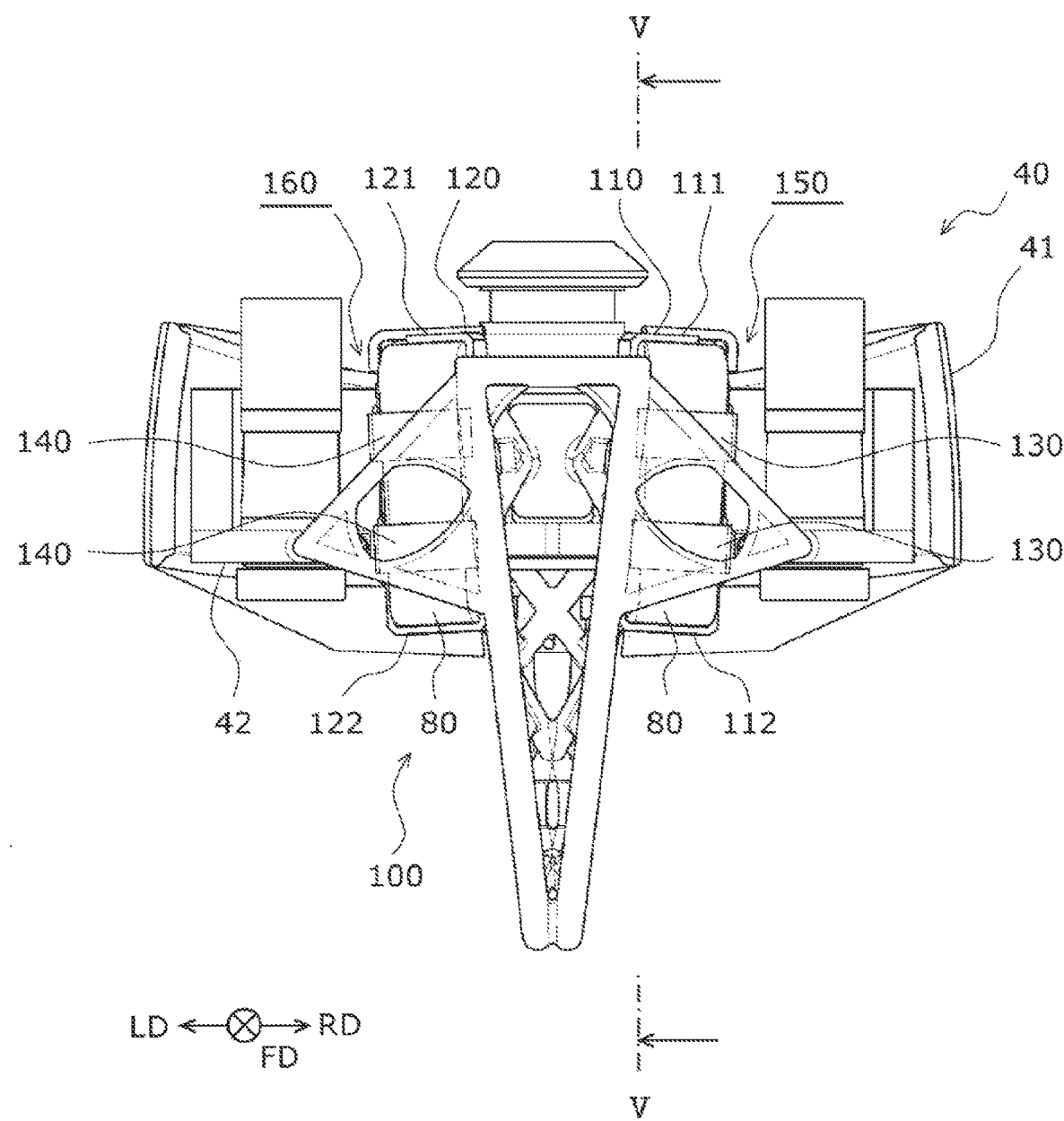
FIG. 4 is a rear view illustrating the lower body of FIG. 3, when seen from the rear through cladding.
Figure 5:
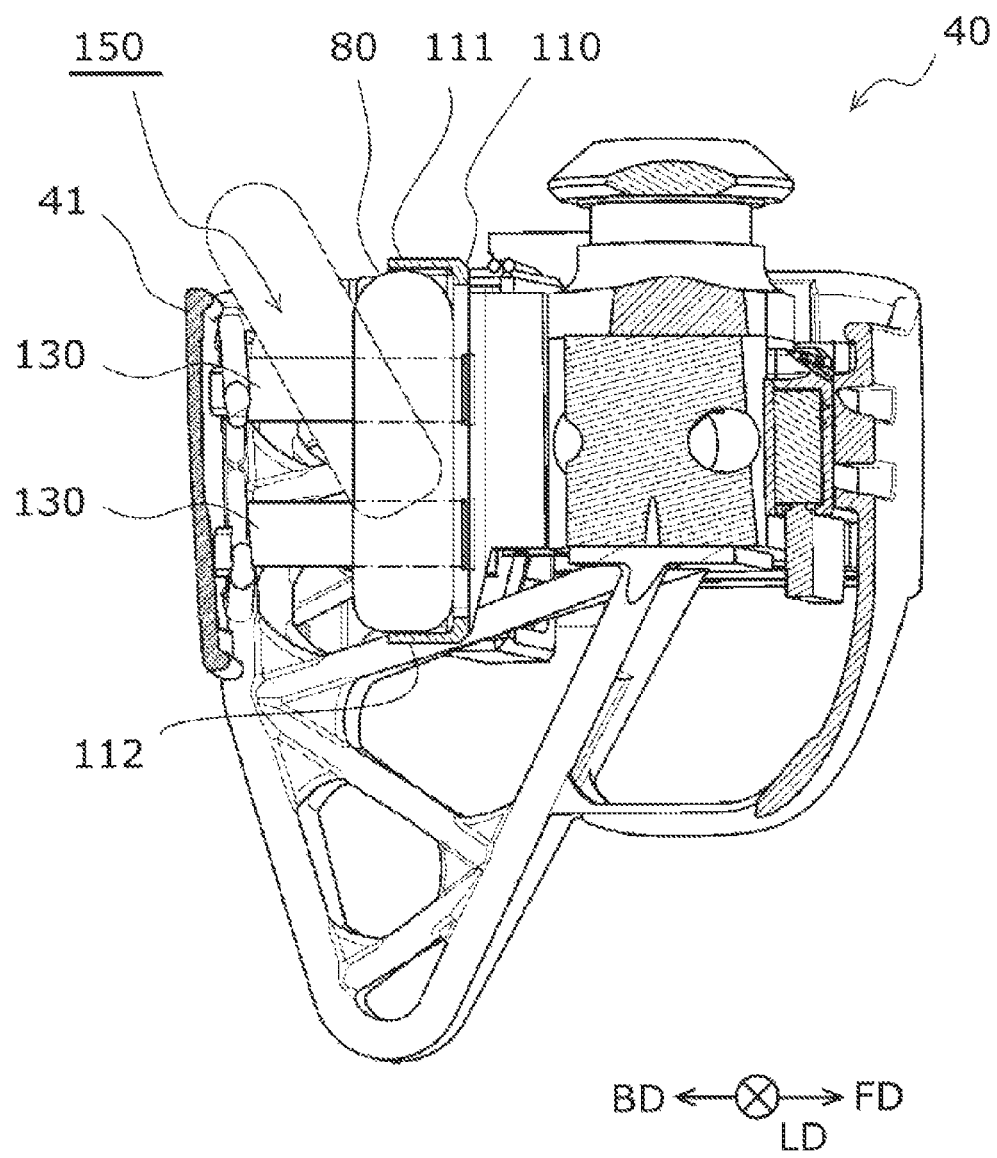
FIG. 5 is a cross-sectional side view illustrating a cross section taken along a line V-V of the lower body of FIG. 4.

A configuration of the secondary battery accommodating structure 100 is described. FIG. 3 is a perspective view illustrating one example of a configuration of the lower body 40 of the humanoid robot 1 according to this embodiment, when seen from the rear. FIG. 4 is a rear view illustrating the lower body 40 of FIG. 3, when seen from the rear through the cladding 41. FIG. 5 is a cross-sectional side view illustrating a cross section taken along a line V-V of the lower body 40 of FIG. 4. Note that FIGS. 3 and 5 illustrate a layout of the secondary battery module 80 with respect to the secondary battery accommodating structure 100, or a state in the middle of drawing out the secondary battery module 80.

As illustrated in FIGS. 3 to 5, the lower body 40 is provided inside the cladding 41 with a frame 42. The frame 42 is configured to be connected with the joint 70 and the legs 60. The cladding 41 covers around the sides of the frame 42 (i.e., covers around the frame 42 in the front direction FD, the back direction BD, the left direction LD, and the right direction RD).

The secondary battery accommodating structure 100 includes two accommodating parts 110 and 120 disposed at a back part (back direction BD) of the frame 42 which is the back side of the lower body 40, inside the cladding 41 of the lower body 40. The accommodating parts 110 and 120 are disposed at both left and right sides of the lower body 40 with respect to the center of the lower body 40. The accommodating part 110 is disposed in the right direction RD, and the accommodating part 120 is disposed in the left direction LD. Although not limited to this configuration, the accommodating parts 110 and 120 are disposed at equidistance positions in the right direction RD and the left direction LD with respect to the center of the lower body 40.

The accommodating parts 110 and 120 open in the back direction BD which is one example of a "first direction," and they are configured to accommodate the secondary battery modules 80. The accommodating part 110 includes a first engaging part 111 and a second engaging part 112 which can engage with the accommodated secondary battery module 80 from above and below, respectively. The accommodating part 120 includes a first engaging part 121 and a second engaging part 122 which can engage with the accommodated secondary battery module 80 from above and below, respectively. For example, as illustrated in FIG. 5, such accommodating parts 110 and 120 may be each comprised of a U-shaped plate-like member oriented sideways. Each of the engaging parts 111, 112, 121, and 122 has a plate-like shape which extends in the left-and-right direction and projects in the back direction BD. Therefore, the accommodating parts 110 and 120 open in the back direction BD, the left direction LD, and the right direction RD. Further, as illustrated in FIG. 4, each of the lower engaging parts 112 and 122 may have a vertically-oriented U-shaped plate-like shape so that it can engage with the secondary battery module 80 from the left and right sides. Note that the terms "above" and "up(ward)" as used herein refer to a direction from the legs 60 to the head 10, and the terms "below" and "down(ward)" as used herein refer to a direction from the head 10 to the legs 60.

Moreover, the secondary battery accommodating structure 100 includes, inside the cladding 41, fixing parts 130 and 140 which are disposed at the accommodating parts 110 and 120, respectively. The fixing parts 130 and 140 fix the secondary battery modules 80 accommodated in the accommodating parts 110 and 120 to the accommodating parts, respectively.

Although in this embodiment the fixing parts 130 and 140 include belt-like Hook-and-Loop fasteners which detachably fix the secondary battery modules 80 to the accommodating parts 110 and 120, respectively, they may have any configuration as long as the above-described fixation is possible. One example of the Hook-and-Loop fastener is Velcro®. The belt-like Hook-and-Loop fasteners fix the secondary battery modules 80 to the accommodating parts 110 and 120 by being wound on the external surfaces of the secondary battery modules 80. In this embodiment, the fixing parts 130 and 140, each comprised of the Hook-and- Loop fastener, are disposed at two places lined up in the up-and-down direction with respect to the accommodating parts 110 and 120, respectively, and extend sideways, and fix the secondary battery module 80 at the two places. However, the quantity, the position, and the extending direction of the fixing parts 130 and 140 are not limited in particular, as long as the secondary battery module 80 is fixable.

The secondary battery accommodating structure 100 includes drawing spaces 150 and 160 inside the cladding 41. The drawing spaces 150 and 160 are located in the back direction BD from the accommodating parts 110 and 120, and are formed between the accommodating parts 110 and 120 and the cladding 41, respectively. The drawing spaces 150 and 160 are spaces for accommodating and pulling out the secondary battery modules 80 into/from the accommodating parts 110 and 120, respectively. The drawing spaces 150 and 160 open at least either one of upwardly or downwardly so that the secondary battery modules 80 enter and exit (in and out) into/from the cladding 41, and in this embodiment, they open upwardly. For example, by the humanoid robot 1 bending the upper body 30 forward, there will be no object in the space above the drawing spaces 150 and 160.

Further, each of the drawing spaces 150 and 160 has the size which can contain the secondary battery module 80. In detail, the drawing spaces 150 and 160 have such a size that the secondary battery module 80 in the posture in which its longitudinal direction is the up-and-down direction can be inserted into the drawing spaces 150 and 160 from above, respectively. Each of the drawing spaces 150 and 160 has the above-described size in the front direction FD, the back direction BD, the left direction LD, and the right direction RD. The drawing spaces 150 and 160 preferably have such a size, which will be described later, that the user's hand or finger(s) can be inserted into the drawing spaces 150 and 160 to place and remove the secondary battery modules 80 in/from the accommodating parts 110 and 120, respectively.

Note that such drawing spaces 150 and 160 may be spaces formed by increasing the size of the cladding 41 for the secondary battery accommodating structure 100, or may be spaces utilizing empty space(s) inside the cladding 41. In this embodiment, the latter is adopted. In the humanoid robot 1 according to this embodiment, similar to the lower body 40, the upper body 30 is covered with the cladding 31, and a projecting amount of the cladding 31 in the back direction BD with respect to the head 10 is larger than a projecting amount of the cladding 31 in the front direction FD with respect to the head 10. For this reason, the projecting amount of the cladding 41 of the lower body 40 in the back direction BD is similarly larger than the projecting amount of the cladding 41 in the front direction FD. Therefore, it is easier to secure the empty space inside the cladding 41, in the back part of the frame 42.

Note that the humanoid robot 1 according to this embodiment is provided with the secondary battery module 80 as the power supply for controlling the electrical equipment, such as the circuit board, and is provided with other secondary battery modules (not illustrated) as motive power supplies for the drives etc. of the joints. The secondary battery module 80 as the control power supply is a small-sized secondary battery module, and is smaller than the secondary battery module for the motive power supply. Such a small secondary battery module 80 is preferred for the easier replacement. Further, the humanoid robot 1 is provided with the secondary battery module for the motive power supply to the back part inside the cladding 31 of the upper body 30. Thus, the projecting amount of the cladding 31 in the back direction BD is larger than the projecting amount of the cladding 31 in the front direction FD.

<Placement and Removing Operation of Secondary Battery Module>

The placement and removal operation of the secondary battery modules 80 to/from the accommodating parts 110 and 120 of the secondary battery accommodating structure 100 are described. Note that since the placement and removal operation to/from the accommodating parts 110 and 120 are similar, only explanation about the accommodating part 110 is given to omit the explanation about the accommodating part 120.

When the secondary battery module 80 is placed in the accommodating part 110, as illustrated in FIGS. 2 and 5, a user, such as an operator, inserts the secondary battery module 80 into the drawing space 150 through a gap between the cladding 31 of the upper body 30 and the cladding 41 of the lower body 40. At this time, the secondary battery module 80 is inserted downwardly in a posture in which its longitudinal direction becomes the up-and-down direction. Note that the user may bend beforehand the upper body 30 of the humanoid robot 1 forward with respect to the lower body 40. Therefore, since the user can insert the secondary battery module 80 into the drawing space 150 from above, the inserting operation becomes easier. Subsequent operations also become easier.

Further, the user lowers the secondary battery module 80 in a state where the secondary battery module 80 leans so that a lower part thereof projects in the front direction FD more than an upper part, and places the lower part of the secondary battery module 80 on the second engaging part 112 of the accommodating part 110.

Further, the user pushes the upper part of the secondary battery module 80 in the front direction FD to push in the secondary battery module 80 between the first engaging part 111 and the second engaging part 112. Therefore, the upper part and the lower part of the secondary battery module 80 engage, at their inner sides, with the first engaging part 111 and the second engaging part 112, respectively, and therefore, the secondary battery module 80 is held by the accommodating part 110.

The user inserts his/her own hand or finger(s) into the drawing space 150 from above, winds the two fixing parts 130 around the external surface of the secondary battery module 80 to fasten it. Since the fixing part 130 is configured to be fastened by the Hook-and-Loop fastener, the fastening of the fixing part 130 is easy.

Further, the user connects a terminal (not illustrated) of the secondary battery module 80 to a terminal (not illustrated) of the humanoid robot 1 to electrically connect the secondary battery module 80 to the humanoid robot 1.

Next, when removing the secondary battery module 80 from the accommodating part 110, the user inserts his/her own hand or finger(s) from above into the drawing space 150 inside the cladding 41, and cancels the connection of the terminal (not illustrated) of the secondary battery module 80. Further, the user cancels the fastening of the fixing part 130 to the secondary battery module 80. Since the fixing part 130 is configured to fasten with the Hook-and-Loop fastener, the cancel of the fastening of the fixing part 130 is easy. Note that the user may bend beforehand the upper body 30 forward with respect to the lower body 40. Therefore, the user can easily perform the above-described operation and subsequent operations.

Then, the user grasps the upper part of the secondary battery module 80 and pulls it in the back direction BD to cancel the engagement between the upper part and the first engaging part 111 of the accommodating part 110. Therefore, the upper part of the secondary battery module 80 is pulled out into the drawing space 150 from the accommodating part 110 in the back direction BD. The secondary battery module 80 is set in the posture in which the upper part of the secondary battery module 80 projects in the back direction BD more than the lower part.

Next, by raising the grasped secondary battery module 80, the user takes out the secondary battery module 80 from the accommodating part 110 and the drawing space 150 to above the cladding 41.

As described above, the user can perform the placement and removal of the secondary battery module 80 to/from the accommodating part 110, without being accompanied by the attachment and detachment of the cladding 41 of the lower body 40.

<Effects etc.>

The secondary battery accommodating structure 100 according to this embodiment includes the accommodating parts 110 and 120 of the secondary battery modules 80, which are disposed inside the cladding 41 of the lower body 40 of the humanoid robot 1 and opens in the first direction that is sideway (lateral direction), the fixing parts 130 and 140 which fix the secondary battery modules 80 to the accommodating parts 110 and 120, and the drawing spaces 150 and 160 of the secondary battery modules 80, which are located in the first direction with respect to the accommodating parts 110 and 120, inside the cladding 41. Further, the drawing spaces 150 and 160 open at least either one of upwardly or downwardly so that the secondary battery modules 80 can enter and exit therethrough.

According to this configuration, the user of the humanoid robot 1 can insert his/her own hand or finger(s) into the drawing space 150 or 160 inside the cladding 41 from above or below, cancel the fixation of the fixing part 130 or 140 to the secondary battery module 80 accommodated in the accommodating part 110 or 120, and pull out the secondary battery module 80 in the first direction. Therefore, the user can pull out the secondary battery module 80 into the drawing space 150 or 160. Further, by pulling out the secondary battery module 80 upwardly or downwardly, the user can take out the secondary battery module 80 to the exterior of the cladding 41 from the drawing space 150 or 160. Further, the user can insert the secondary battery module 80 into the drawing space 150 or 160 from the exterior of the cladding 41, above or below the drawing space 150 or 160. Moreover, the user can accommodate the secondary battery module 80 in the accommodating part 110 or 120 by moving the secondary battery module 80 in the direction opposite from the first direction. Then, the user can insert his/her own hand or finger(s) in the drawing space 150 or 160, and fix the secondary battery module 80 to the accommodating part 110 or 120 by the fixing part 130 or 140. Therefore, the user can easily perform the extraction and placement (i.e., replacement) of the secondary battery modules 80 from/to the accommodating parts 110 and 120, without detaching and attaching the cladding 41.

Moreover, the accommodating parts 110 and 120 may be disposed at the back side of the lower body 40, and the first direction may be a direction from the front part of the lower body 40 to the back part. According to this configuration, the user can replace the secondary battery modules 80 in the accommodating parts 110 and 120 by accessing from the back side of the lower body 40. Further, in the humanoid robot 1, it is easier to secure the spaces for the accommodating parts 110 and 120 and the drawing spaces 150 and 160 at the back side of the lower body 40. Therefore, the placement of the secondary battery accommodating structure 100 is easy.

Further, the accommodating parts 110 and 120 may include the first engaging parts 111 and 121 and the second engaging parts 112 and 122 which can engage with the secondary battery modules 80 at above and below. According to this configuration, by engaging the secondary battery module 80 with the first engaging part 111 or 121 and the second engaging part 112 or 122, the secondary battery module 80 can be accommodated and held in the accommodating part 110 or 120. Therefore, the user's operation for accommodating the secondary battery modules 80 in the accommodating parts 110 and 120 may be an engaging operation of the two engaging parts with each secondary battery module 80, and therefore, it can be simplified. Thus, it is possible to reduce the size of the drawing spaces 150 and 160 required for the user to place and take out the secondary battery modules 80. Note that the first engaging parts 111 and 121 and the second engaging parts 112 and 122 may be configured to closely engage with or fit to the secondary battery modules 80, or may be configured to loosely engage or fit.

Further, the secondary battery accommodating structure 100 may include at least two accommodating parts 110 and 120, and the accommodating parts 110 and 120 may be disposed at both sides in the left-and-right direction of the lower body 40 with respect to the center of the lower body 40. According to this configuration, it becomes possible to dispose at least two secondary battery modules 80 at equidistance positions in the left-and-right direction with respect to the center axis of the humanoid robot 1. Therefore, it is suppressed that the center of gravity of the humanoid robot 1 becomes offset in the left-and-right direction, and therefore, the balance of the center of gravity of the humanoid robot 1 improves.

Further, the humanoid robot 1 may include the upper body 30 and the lower body 40 which are connected with each other via the joint 70, and the accommodating parts 110 and 120 and the drawing spaces 150 and 160 may be disposed at the back side of the joint 70, inside the cladding 41 of the lower body 40, and the drawing spaces 150 and 160 may open upwardly. According to this configuration, by bending the upper body 30 forward with respect to the lower body 40, there will be no object, such as the upper body 30, above the drawing spaces 150 and 160. Therefore, the replacing operation of the secondary battery modules 80 at the accommodating parts 110 and 120 becomes easier.

Further, the fixing parts 130 and 140 may include Hook-and-Loop fasteners which detachably fix the secondary battery modules 80 to the accommodating parts 110 and 120. According to this configuration, operation for fixing and releasing the secondary battery modules 80 becomes simpler.

Further, each of the drawing spaces 150 and 160 may have the size which can include the secondary battery module 80. According to this configuration, the placement and extracting operation of the secondary battery modules 80 to/from the accommodating parts 110 and 120 through the drawing spaces 150 and 160 becomes easier.

The humanoid robot 1 according to this embodiment is provided with the secondary battery accommodating structure 100 and the lower body 40. According to this configuration, similar effects to the secondary battery accommodating structure 100 according to this embodiment can be acquired.

Other Embodiments

Although the example of the embodiment of the present disclosure is described above, the present disclosure is not limited to the above embodiment. That is, various modifications and improvements are possible without departing from the scope of the present disclosure. For example, those in which various modifications are applied to the embodiment, and the modes established by combining components in different embodiments are also encompassed within the scope of the present disclosure.

For example, although the secondary battery accommodating structure 100 according to the above embodiment is disposed at the lower body 40 of the humanoid robot 1, it is not limited to this configuration. For example, the secondary battery accommodating structure 100 may be disposed at the upper body 30, or may be disposed at other parts, such as the head 10, the neck 20, the arm(s) 50, or the leg(s) 60. The secondary battery accommodating structure 100 may be disposed at any locations of the humanoid robot 1.

Although the secondary battery accommodating structure 100 according to the above embodiment includes the two accommodating parts 110 and 120 and the two drawing spaces 150 and 160, it is not limited to this configuration. The secondary battery accommodating structure 100 may include a single accommodating part, or may include three or more accommodating parts. The number of drawing spaces may be the same as or may be different from the number of accommodating parts. For example, one drawing space may serve as a drawing space for two or more accommodating parts.

Further, although in the secondary battery accommodating structure 100 according to the above embodiment the drawing spaces 150 and 160 open upwardly, it is not limited to this configuration. The opening direction of the drawing spaces 150 and 160 may be any directions as long as, without accompanying the attachment and the detachment of the cladding 41, the extraction or the insertion of the secondary battery modules 80 to the exterior of the cladding 41 or to the opposite direction is possible through the drawing spaces 150 and 160. For example, the drawing spaces 150 and 160 may open in a direction along an inner surface of the cladding 41, such as downward and sideways. Similarly, the number of opening directions of the drawing spaces 150 and 160 is not limited to one, but may be two or more.

Although in the secondary battery accommodating structure 100 according to the above embodiment the accommodating parts 110 and 120 have the plate-like first engaging parts 111 and 121 and the plate-like second engaging parts 112 and 122, respectively, the shape and quantity of engaging parts are not limited to this configuration. For example, the shape and quantity of the engaging parts of the accommodating parts 110 and 120 may be such a shape and quantity that they can at least temporarily hold the secondary battery modules 80 for the fixing operation of the fixing parts 130 and 140. Note that, when the secondary battery modules 80 are fixed to the accommodating parts 110 and 120 by engaging or fitting the engaging parts with the secondary battery modules 80, the fixing parts 130 and 140 may be omitted.

The invention claimed is:

1. A secondary battery accommodating structure disposed at a humanoid robot having a body comprising an upper body to which arms are attached, and a lower body to which legs are attached, the upper body and the lower body connected to each other by a joint an area therebetween corresponding to a human waist, the secondary battery accommodating structure comprising:
   an accommodating part for a secondary battery module, that is disposed inside a cladding of the lower body of the humanoid robot and opens in a first direction that is a lateral direction, the secondary battery module having an upper part and a lower part;
   a fixing part that fixes the secondary battery module to the accommodating part; and
   a drawing space for the secondary battery module, located in the first direction with respect to the accommodating part, within the cladding of the lower body, wherein
   the drawing space opens one of: upwardly; and downwardly, to allow entry and exit in and out of the secondary battery module,
   the accommodating part includes a first engaging part and a second engaging part that engage with the upper part and the lower part of the secondary battery module, and
   the upper body and the lower body are separated by a gap in the area where the upper body and the lower body are connected with each other via the joint, the accommodating part and the drawing space are disposed at a back side of the joint, inside cladding of the lower body.

2. The secondary battery accommodating structure of claim 1, wherein the accommodating part is disposed at a back side of the body, and
   wherein the first direction is a direction from the front of the body to the back.

3. The secondary battery accommodating structure of claim 2, wherein the accommodating part includes at least two accommodating parts, the at least two accommodating parts disposed at both sides in a left-and-right direction of the body with respect to the center of the body.

4. The secondary battery accommodating structure of claim 3, wherein the drawing space opens upwardly.

5. The secondary battery accommodating structure of claim 2, wherein the drawing space opens upwardly.

6. The secondary battery accommodating structure of claim 1, wherein the accommodating part includes at least two accommodating parts, the at least two accommodating parts disposed at both sides in a left-and-right direction of the body with respect to the center of the body.

7. The secondary battery accommodating structure of claim 6, wherein the drawing space opens upwardly.

8. The secondary battery accommodating structure of claim 1, wherein the drawing space opens upwardly.

9. The secondary battery accommodating structure of claim 1, wherein the fixing part includes a Hook-and-Loop fastener that detachably fixes the secondary battery module to the accommodating part.

10. The secondary battery accommodating structure of claim 1, wherein the drawing space has the size to contain the secondary battery module.

11. A humanoid robot, comprising:
    the secondary battery accommodating structure of claim 1; and
    the body.

12. The secondary battery accommodating structure of claim 1, wherein the drawing space comprises a first drawing space on a left side of the body within the cladding of the body and a second drawing space on a right side of the body within the cladding of the body.

* * * * *